United States Patent
Tinti et al.

(10) Patent No.: US 6,301,277 B1
(45) Date of Patent: Oct. 9, 2001

(54) SOLID STATE LASER MASTER OSCILLATOR GAIN MODULE

(75) Inventors: Robert Tinti, Lakewood; Stener Kleve, Rolling Hills Estates; Rodger C. Hilyard, Canyon Country, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/197,285

(22) Filed: Nov. 20, 1998

(51) Int. Cl.[7] .............................. H01S 3/04; H01S 3/091; H01S 3/09; H01S 3/08; H01S 3/00
(52) U.S. Cl. ................... 372/35; 372/70; 372/92; 372/98; 372/109
(58) Field of Search ................. 372/35, 70, 92, 372/98, 109; 359/333

(56) References Cited

U.S. PATENT DOCUMENTS

| | | | |
|---|---|---|---|
| 4,378,601 | * 3/1983 | Eggleston, III et al. | 372/66 |
| 4,468,774 | * 8/1984 | Robbins | 372/34 |
| 4,945,544 | 7/1990 | Tanaka et al. | |
| 4,993,041 | * 2/1991 | Sidler et al. | 372/98 |
| 5,557,628 | 9/1996 | Kuba et al. | |
| 5,783,818 | * 7/1998 | Manabe et al. | 250/239 |
| 5,790,575 | * 8/1998 | Zamel et al. | 372/35 |

FOREIGN PATENT DOCUMENTS

| | | |
|---|---|---|
| 1-248582 | 10/1989 | (JP). |
| 7-94808 | 4/1995 | (JP). |
| 9-326524 | 12/1997 | (JP). |

* cited by examiner

Primary Examiner—Frank G. Font
Assistant Examiner—Armando Rodriguez
(74) Attorney, Agent, or Firm—Harness, Dickey & Pierce, P.L.C.

(57) ABSTRACT

A gain module is provided for a master oscillator pumped amplifier system of a solid state laser including a ceramic housing supporting a Nd:YAG lasing slab therein. The slab is fixed relative to the housing by a pair of oppositely disposed compliant and optically transmissive securing members fictionally wedged between the housing and the lasing slab. A plurality of fluid passages are formed in the housing so as to communicate with the lasing slab. As fluid overflows the slab, the compliant securing members prevent the slab from vibrating. Preferably, the securing members are formed as U-shaped polycarbonate bars frictionally engaging the slab on a first surface and positionally adjustable driver bars coupled to the housing via a set screw block on a second surface.

17 Claims, 4 Drawing Sheets

SOLID STATE LASER MASTER OSCILLATOR GAIN MODULE

This invention was made with Government support under contract F29601-97-C-0001 awarded by the United States Air Force. The government has certain rights in this invention.

BACKGROUND OF THE INVENTION

1. Technical Field

The present invention relates generally to master oscillator gain modules for solid state lasers and, more particularly, to a device for preventing the vibration of a lasing slab used within the master oscillator gain module.

2. Discussion

One type of solid state laser is known in the act as a master oscillator pumped amplifier system. The master oscillator portion of this type of laser is used to format and tailor the laser pulse according to the desired application of the system. To accomplish this, the master oscillator employs a gain module.

Some gain modules include a Nd:YAG crystal or slab positioned between two resonator mirrors. To initiate photons into lasing, the slab is pumped with diode light. The resonator mirrors then direct the photons along a discrete path prior to the photons entering the next subsystem of the laser.

Proper alignment of the lasing slab and resonator mirrors is critical to the operation of the laser. At times, alignment stability is required to be as low as 10 microradians. Additionally, the temperature profile across the lasing slab is crucial to laser operation. An increased thermal gradient across the cross-section of the lasing slab causes lensing effects at the ends of the slab. That is, the temperature gradient distorts the geometry of the slab ends from a flat plane to a three-dimensional curve (i.e., a lens) thereby changing the focal length of the slab.

According to the prior art, the lasing slab is cooled with water to prevent temperature induced lensing. However, the flowing water causes the slab to vibrate thereby compromising stability. Accordingly, there is a need in the art for a device which allows the slab to be cooled without causing excess vibrations.

SUMMARY OF THE INVENTION

The above and other objects are provided by a gain module for a master oscillator pumped amplifier including a ceramic housing supporting a Nd:YAG lasing slab therein. The slab is fixed relative to the housing by a pair of oppositely disposed compliant and optically transmissive securing members fictionally wedged between the housing and the lasing slab. A plurality of fluid passages are formed in the housing so as to communicate with the lasing slab. As fluid overflows the slab, the compliant securing members prevent the slab from vibrating. In a more preferred embodiment of the present invention, the securing members are formed as U-shaped polycarbonate bars frictionally engaging a first edge of the slab on a first surface and positionally adjustable driver bars coupled to the housing on a second surface.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a device for cooling a lasing slab disposed in a gain module of a master oscillator pumped amplifier system while preventing the lasing slab from vibrating. The device preferably consists of a housing including a plurality of fluid passages formed therein communicating with the lasing slab. A pair of U-shaped polycarbonate bars are wedged between the housing and the lasing slab to prevent the lasing slab from vibrating when it is overflowed with fluid coolant. The polycarbonate material provides sufficient compliance for accommodating dimensional changes of the slab as it warms up to operating temperature and also is transmissive to a known operational wavelength of solid state lasers.

Figure 1:
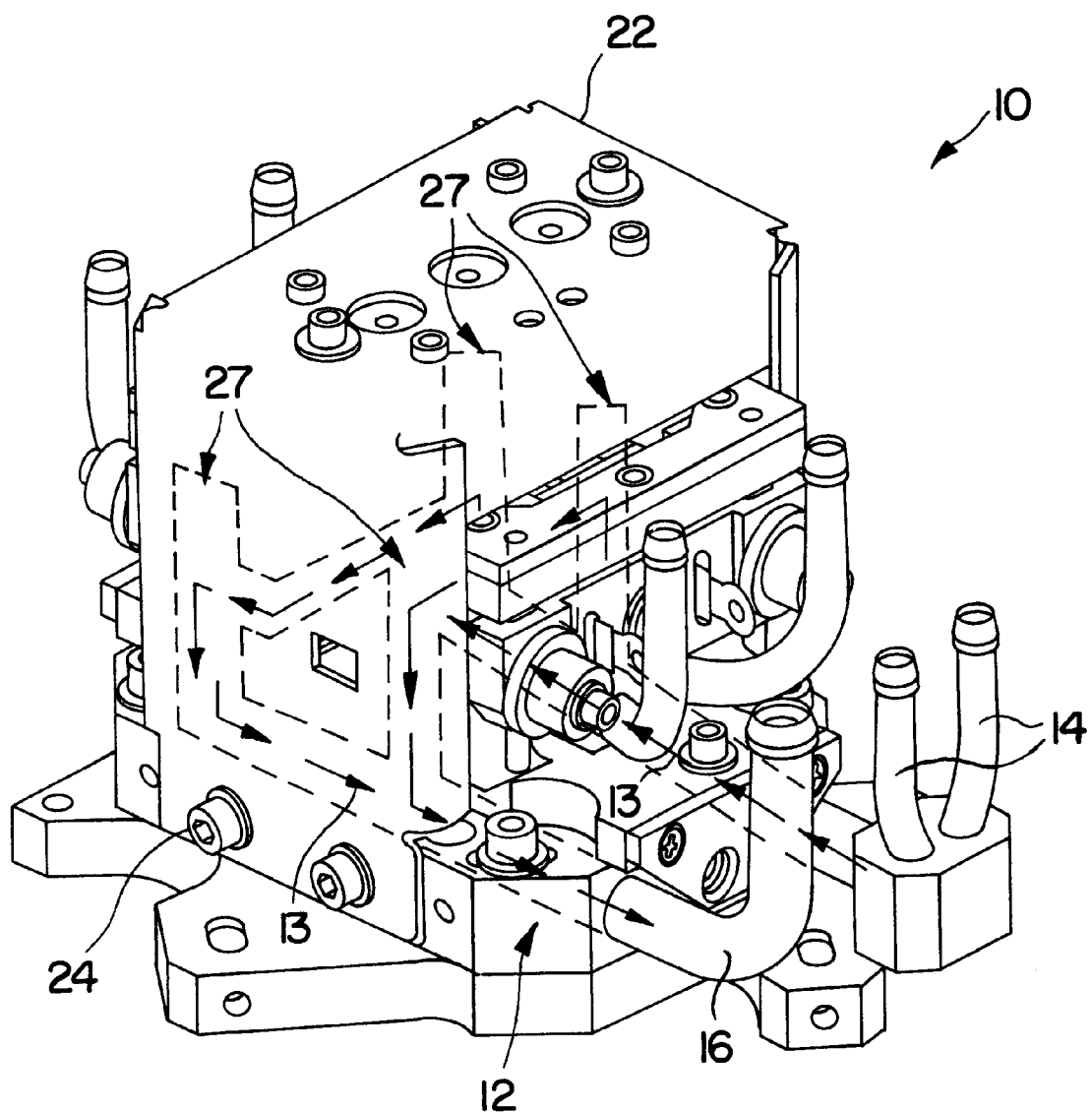
FIG. 1 is a perspective view of a gain module for a master oscillator pumped amplifier system according to the present invention.

Turning now to the drawing figures, FIG. 1 illustrates a gain module 10 for a master oscillator pumped amplifier system according to the present invention. The gain module 10 includes a base member or distribution manifold 12 including a plurality of lasing slab fluid coolant passages 13 shown in phantom formed therein. A first pair of lasing slab fluid inlet conduits 14 are coupled to the base member 12 so as to communicate with the fluid passages 13 formed therein. A first lasing slab fluid outlet conduit 16 is coupled to the base member 12 at an opposite end of the fluid passages 13 as the first inlet conduits 14. As will be fully described below, fluid coolant, such as water, is delivered to the fluid passages 13 of the base member 12 by way of the first inlet conduits 14 such that the fluid coolant overflows the lasing slab (not shown) supported within the gain module 10. Thereafter, the fluid coolant flows out of the gain module 10 by way of the first outlet conduit 16. Preferably, the inlet conduits 14 and outlet conduit 16 are coupled to the base member 12 by brazing.

A shroud 22 is coupled to the base member 12 by a plurality of threaded fasteners 24. Preferably, the shroud 22 is thermally conductive so as to transport absorbed heat into the coolant. The base member 12 is preferably formed of a metallic material to conduct heat, accommodate threaded holes for fasteners and permits manufacturing processes such as brazing for joining the fluid conduits 14 and 16 thereto.

Figure 2:
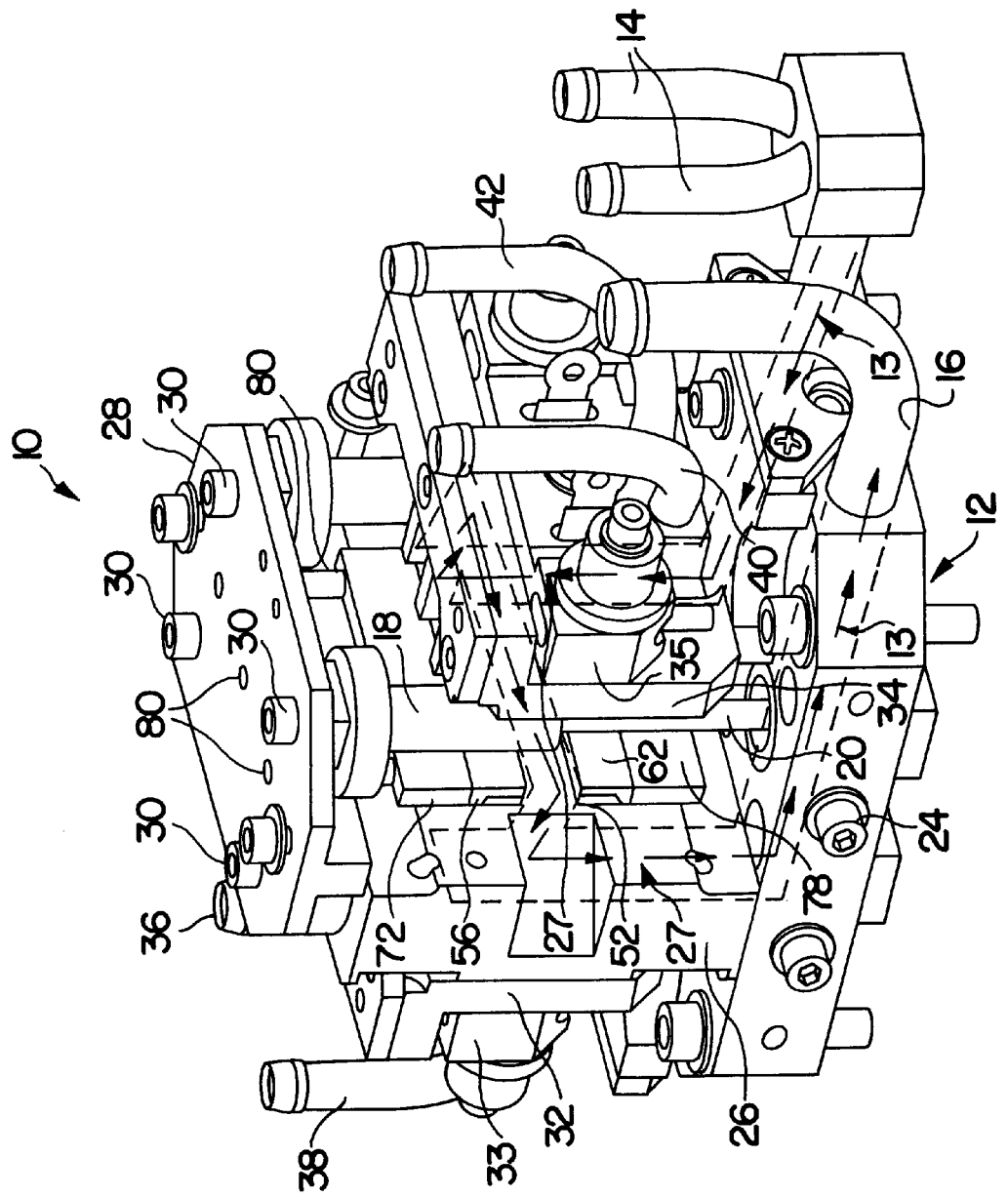
FIG. 2 is a perspective view of the gain module of FIG. 1 having its shroud and housing cover removed to enable clear viewing of the lasing slab and lasing slab securing members of the present invention.
Figure 3:
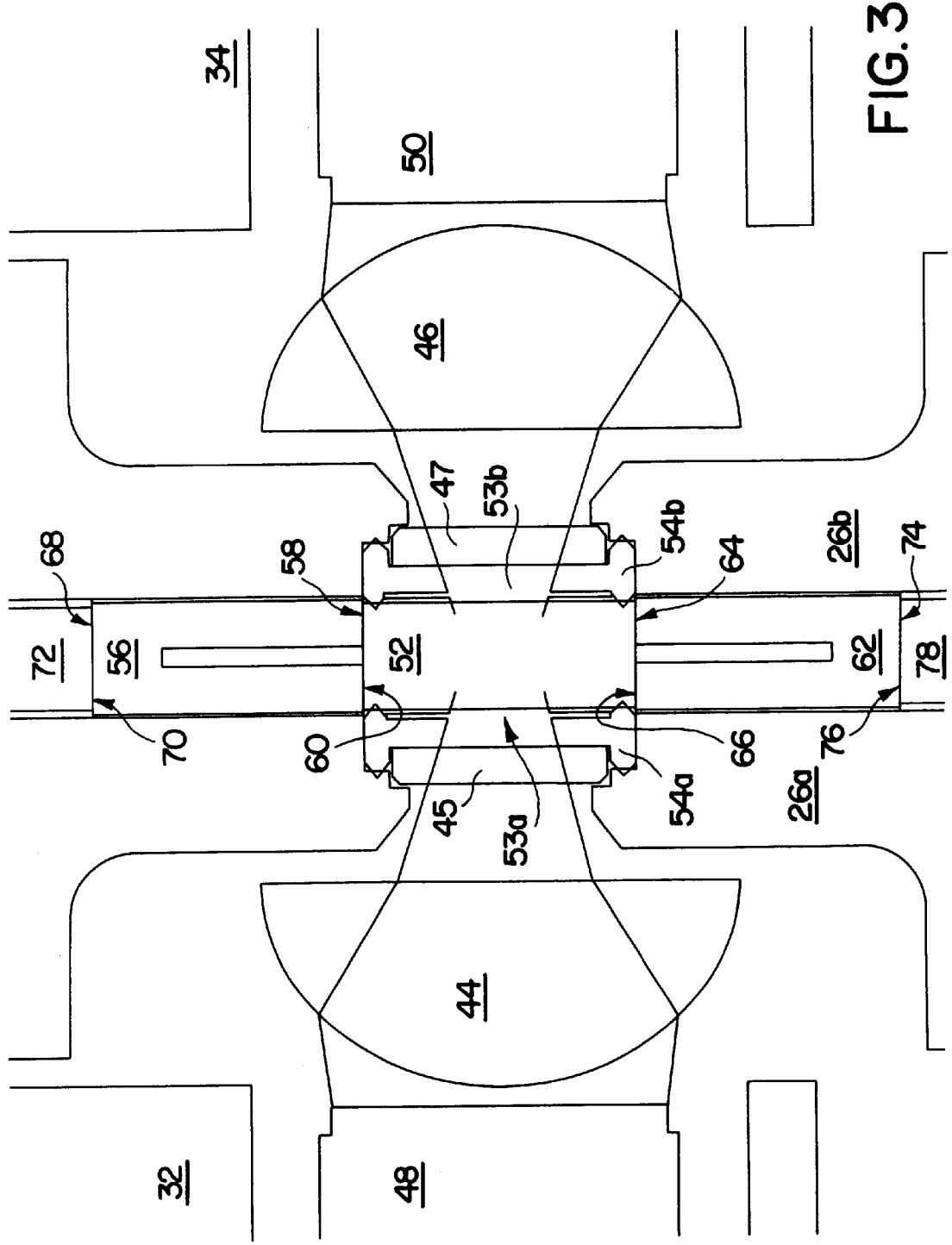
FIG. 3 is a cross-sectional view of the gain module of FIG. 2 illustrating the lasing slab and lasing slab securing members of the present invention in greater detail.

Turning now to FIG. 2, the gain module 10 is illustrated with the shroud 22 of FIG. 1 removed. The gain module 10 includes a first ceramic housing 26*a* and a second ceramic housing 26*b* (also referred to as the housing cover 26*b*)

vertically coupled to the base member 12. For the sake of clarity, only the first housing 26a has been illustrated in FIG. 2. However, the second housing 26b is illustrated in FIG. 3. Each of the housings 26a and 26b include fluid passages 27 therein communicating with the fluid passages 13 in the base member 12 so that the fluid coolant therein may be delivered to a desired location. It should also be noted that ceramic is preferred for the housing 26a and housing cover 26b since it diffusely reflects 808 mn and 1064 nm light (commonly found in solid state lasers) and is thermally stable.

A metallic top member or set screw block 28 is coupled to a top surface of the first and second housings 26a and 26b. Preferably, the top member 28 is connected to the base member 12 by a plurality of threaded fasteners 30 passing through apertures in each of the housings 26a and 26b. Even more preferably, the threaded fasteners 30 consist of metallic T-nuts 18 and threaded studs 20 which act as rigid spacers between he top member 28 and the base member 12 while securing the housings 26a and 26b in place. In this way, over-torquing is prevented by the action of the t-nuts and the likelihood of cracking either of the ceramic housings 26a and 26b is reduced.

A first diode translation stage 32 is adjustably disposed adjacent the first housing 26a. Similarly, a second diode translation stage 34 is adjustably disposed adjacent the second housing 26b (see FIG. 3). A first diode fluid coolant inlet conduit 36 is coupled to a first diode manifold 33 mounted to the first diode translation stage 32 so as to communicate with a diode fluid coolant passage (not shown) formed therein. A first diode fluid coolant outlet conduit 38 is coupled to the first diode manifold 33 at an opposite end of the diode fluid coolant passage. As such, diode fluid coolant may be delivered to a first diode (see FIG. 3) coupled to the first diode manifold 33 by way of the first inlet conduit 36 and removed therefrom by the first outlet conduit 38.

Similarly, a second diode fluid coolant inlet conduit 40 is coupled to a second diode manifold 35 mounted to the second diode translation stage 34 so as to communicate with a diode fluid coolant passage (not shown) formed therein. A second diode fluid coolant outlet conduit 42 is coupled to the second diode manifold 35 at an opposite end of the diode fluid coolant passage. Thus, diode fluid coolant may be delivered to a second diode (see FIG. 3) coupled to the second diode manifold 35 by way of the second inlet conduit 40 and removed therefrom by the second outlet conduit 42. Although many conventional methods of coupling the first and second inlet conduits 36 and 40, and the first and second outlet conduits 38 and 42 to the first and second diode manifolds 33 and 35 are available, it is presently preferred to use brazing.

Referring now to FIG. 3, a first lens 44 is mounted to the first diode translation stage 32 adjacent a window 45 formed within the first housing 26a. A second lens 46 is mounted to the second diode translation stage 34 adjacent a window 47 within the second housing 26b. Similarly, a first diode 48 is coupled to the first diode translation stage 32 while a second diode 50 is coupled to the second diode translation stage 34. As one skilled in the art will readily appreciate, the first lens 44 is positioned in radiation receiving relation to the first diode 48. Likewise, the second lens 46 is disposed in radiation receiving relation to the second diode 50.

Referring now to FIGS. 2 and 3 collectively, a Nd:YAG lasing slab 52 is disposed between the first and second housings 26a and 26b. Importantly, the slab 52 is positioned so as to receive radiation from each of the first and second diodes 48 and 50 via the first and second lenses 44 and 46.

Due to the adjustability of the first and second diode translation stages 32 and 34, the height, distance and angle of the first and second diode 48 and 50 along the lenses 44 and 46 may be changed relative to the lasing slab 52 while the gain module 10 is operating. The focused radiation from the diodes 48 and 50 initiates photons from the Nd:YAG slab 52 into lasing. In order to prevent temporal distortion of the slab 52 as it is irradiated by the diodes 48 and 50, the slab 52 is overflowed with fluid coolant, 53a and 53b preferably in the form of water, from the fluid passages 13 and 27 in the base member 12 and housings 26a and 26b. The fluid coolant is retained along the slab 52 by a pair of I-shaped seals 54a and 54b interdisposed between the slab 52 and the first and second housings 26a and 26b.

To secure the lasing slab 52 within the gain module 10 and to prevent it from vibrating when cooled with overflowing water, a first optically transmissive and compliant U-shaped edge bar or securing member 56 frictionally engages a first edge 58 of the slab 52 along its first surface 60. Similarly, a second optically transmissive and compliant U-shaped edge bar or securing member 62 frictionally engages a second edge 64 of the slab 52 along its first surface 66. Preferably, each of the first and second edge bars 56 and 62 is formed of polycarbonate. Polycarbonate is transmissive to 808 nm and 1064 nm light and is soft enough to fill into roughened portions of the first and second edges 58 and 64 of the slab 52. Further, polycarbonate is compliant enough to accommodate dimensional changes of the slab 52 as it warms up to an operating temperature without cracking.

A second surface 68 of the first edge bar 56 frictionally engages a first surface 70 of a very stiff first ceramic driver bar 72. Similarly, a second surface 74 of the second edge bar 62 frictionally engages a first surface 76 of a second stiff ceramic driver bar 78. The ceramic driver bars 72 and 78 are used so that the proper load may be distributed across the edge bars 56 and 62 and the slab 52. Too low of a load does not take out all of the slab vibration and too high of a load causes birefringence within the slab 52 and associated degraded laser performance.

To further control the distribution of the load, a first plurality of axially spaced apart set screws 80 adjustably interconnect the first driver bar 72 and the top member 28. As such, the compressive force delivered across each of the first and second edge bars 56 and 62 by the first and second driver bars 72 and 78 relative to the slab 52 can be adjusted. If desired, a second plurality of set screws may be used to adjustably interconnect the second driver bar 78 and the base member 12. In this way, the vertical position of the slab 52 relative to the first and second lenses 44 and 46 can be adjusted. Although alternatives are available, it is presently preferred to employ three set screws from the top member 28.

Figure 4:
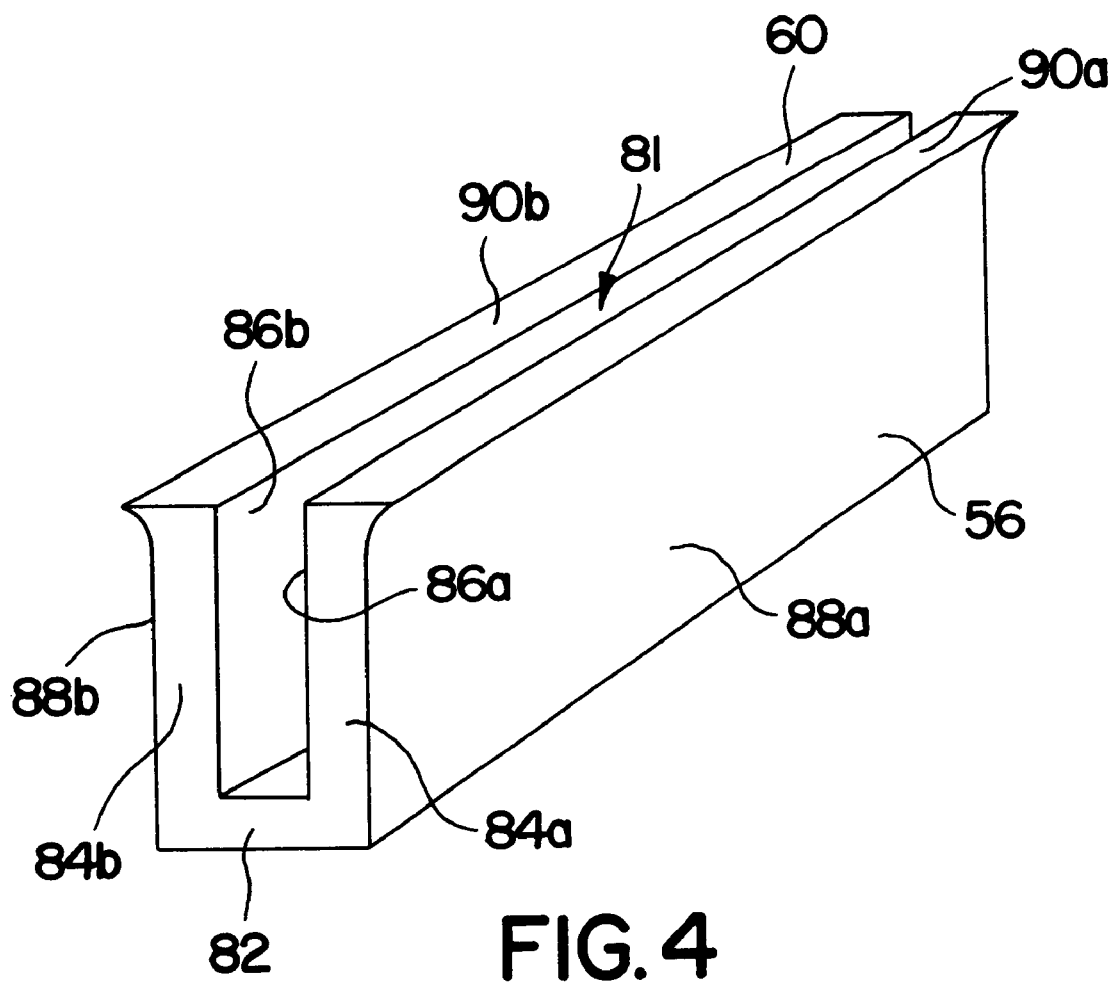
FIG. 4 is a perspective view of a lasing slab securing member of the present invention.

Turning now to FIG. 4, a more detailed view of the first edge bar 56 is shown. Although only the first edge bar 56 is illustrated, one skilled in the art will appreciate that the second edge bar 62 is preferably identical thereto. The edge bar 56 is U-shaped and therefore includes a longitudinally extending slot or channel 81 formed therein. The slot 81 is defined by a top section 82 of the bar 56 and a pair of spaced apart legs 84a and 84b. Each of the legs 84a and 84b includes an essentially planar in board side surface 86 and an arcuate outboard surface 88. The outboard surfaces 88a and 88b diverge away from one another so that the edge bar 56 flares outwardly along its first surface 60. According to this configuration, the distal end 90 of each leg 84a and 84b opposite the top section 82 has increased surface area for engaging the slab 52.

Thus, the present invention provides a device for securing a lasing slab within a housing of a gain module of a master oscillator pumped amplifier system for a solid state laser. The device includes a pair of U-shaped polycarbonate edge bars wedged between the housing and the lasing slab. The compliant nature of the polycarbonate material accommodates dimensional changes of the slab without either cracking. It is also soft enough to fill into the roughened top and bottom surfaces of the Nd:YAG slab. Polycarbonate is also used since it is transmissive to 808 nm and 1064 nm light.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A gain module for a master oscillator pumped amplifier system comprising:
    a housing including coolant passages formed therein;
    a lasing slab positioned within said housing so as to be in coolant receiving relation to said coolant passages;
    a compliant and optically transmissive securing member coupled to said housing along a first surface and frictionally engaging said lasing slab along a second surface so as to prevent said lasing slab from vibrating when impacted with coolant from said coolant passages; and
    a positionally adjustable driving member interposed between said securing member and said housing for urging said securing member against said lasing slab.

2. The gain module of claim 1 wherein said securing member further comprises a polycarbonate member.

3. The gain module of claim 1 further comprising a second compliant and optically transmissive securing member coupled to said housing along a first surface and frictionally engaging said lasing slab along a second surface.

4. The gain module of claim 1 wherein said securing member further comprises a generally rectangularly shaped bar having a slot formed therein along a longitudinal axis.

5. The gain module of claim 4 wherein said bar flares outwardly towards said second surface.

6. The gain module of claim 1 wherein said housing further comprises a base member including said fluid passages formed therein and a pair of housing members vertically coupled to said base member and on opposite sides of said slab.

7. The gain module of claim 1 wherein said lasing slab further comprises an Nd:YAG crystal.

8. A gain module for a master oscillator pumped amplifier system comprising:
    a metallic base member including slab coolant passages formed therein;
    a first housing vertically coupled to said base member;
    a second housing vertically coupled to said base member in spaced relation to said first housing;
    a metallic top member coupled to said first and second housings opposite said base member;
    an Nd:YAG lasing slab positioned between said first and second housings and in fluid receiving relation To said slab coolant passages of said base member;
    a first U-shaped polycarbonate edge bar frictionally engaging a first edge of said lasing slab;
    a second U-shaped polycarbonate edge bar frictionally engaging a second edge of said lasing slab;
    a first ceramic driver bar frictionally engaging said first edge bar along a first surface and coupled to said top member along a second surface; and
    a second ceramic driver bar frictionally engaging said second edge bar along a first surface and coupled to said base member along a second surface.

9. The gain module of claim 8 further comprising a plurality of set screws coupling said first driver bar to said top member such that a compressive force generated across said first edge bar by said first driver bar relative to said lasing slab can be adjusted.

10. The gain module of claim 8 further comprising at least one fastening element disposed between said top member and said base member for preventing a coupling force therebetween from damaging said first and second housings.

11. The gain module of claim 8 further comprising a first diode translation stage disposed adjacent to said first housing.

12. The gain module of claim 11 further comprising a second diode translation stage disposed adjacent to said second housing.

13. The gain module of claim 12 further comprising a first lens coupled to in said first diode translation stage, a second lens coupled to said second translation stage, a first diode coupled to said first diode translation stage adjacent said first lens and a second diode coupled to said second diode translation stage adjacent said second lens.

14. A lasing slab holder for a gain module of a master oscillator pumped amplifier system comprising a polycarbonate member frictionally wedged between a housing of said gain module and a lasing slab disposed therein, wherein said polycarbonate member further comprises a U-shaped bar including a top surface coupled to said housing and a pair of legs perpendicularly projecting from said top surface in spaced relation to one another, each of said legs including a distal end, said polycarbonate member only engaging said lasing slab along said distal end.

15. The lasing slab holder of claim 14 wherein each of said legs includes a generally planar in board surface and an arcuate outboard surface.

16. The lasing slab holder of claim 14 further comprising a second polycarbonate member frictionally wedged between said housing and said lasing slab opposite said other polycarbonate member.

17. A gain module for a master oscillator pumped amplifier system comprising:
    a base member;
    a first housing vertically coupled to said base member;
    a second housing vertically coupled to said base member in spaced relation to said first housing;
    a top member coupled to said first and second housings opposite said base member;
    a first diode translation stage disposed adjacent to said first housing;
    a first lens mounted to said first diode translation stage;
    a first diode coupled to said first diode translation stage and optically communicating with said first lens;
    a second diode translation stage disposed adjacent to said second housing;
    a second lens mounted to said second diode translation stage;
    a second diode coupled to said second diode translation stage and optically communicating with said second lens; and a lasing slab positioned between said first and second housings and in radiation receiving relation to said first and second diode by way of said first and second lenses, wherein said first and second diode translation stages are positionally adjustable so that a distance, height, and angle of said first and second diodes may be varied relative to said lasing slab while said gain module is in operation.

* * * * *